United States Patent
Ericsson et al.

(10) Patent No.: US 8,181,157 B2
(45) Date of Patent: *May 15, 2012

(54) CUSTOM LANGUAGE SUPPORT FOR PROJECT DOCUMENTATION AND EDITING

(75) Inventors: Matthew R. Ericsson, Lyndhurst, OH (US); John E. Belcher, Euclid, OH (US); David R. Curry, Lyndhurst, OH (US); Christopher E. Stanek, Willoughby, OH (US); Fabio Malaspina, Twinsburg, OH (US); Ronald E. Bliss, Twinsburg, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1593 days.

This patent is subject to a terminal disclaimer.

(21) Appl. No.: 11/537,144

(22) Filed: Sep. 29, 2006

(65) Prior Publication Data

US 2008/0127091 A1    May 29, 2008

(51) Int. Cl.
*G06F 9/45* (2006.01)
(52) U.S. Cl. .................................. 717/123
(58) Field of Classification Search ............ 717/123
See application file for complete search history.

(56) References Cited

U.S. PATENT DOCUMENTS

| | | | |
|---|---|---|---|
| 4,510,565 A | 4/1985 | Dummermuth | |
| 4,553,205 A | 11/1985 | Porchia | |
| 4,616,333 A | 10/1986 | Shimoni | |
| 4,718,025 A | 1/1988 | Minor et al. | |
| 4,731,735 A | 3/1988 | Borgendale et al. | |
| 4,773,028 A | 9/1988 | Tallman | |
| 4,831,529 A | 5/1989 | Miike et al. | |
| 4,975,865 A | 12/1990 | Carrette et al. | |
| 5,003,469 A | 3/1991 | Kamiyama et al. | |
| 5,051,932 A | 9/1991 | Inoue et al. | |
| 5,274,781 A | 12/1993 | Gibart | |
| 5,452,201 A | 9/1995 | Pieronek et al. | |
| 5,568,383 A | 10/1996 | Johnson et al. | |
| 5,611,059 A | 3/1997 | Benton et al. | |
| 5,805,442 A | 9/1998 | Crater et al. | |
| 5,812,394 A | 9/1998 | Lewis et al. | |

(Continued)

FOREIGN PATENT DOCUMENTS

EP    0490864    6/1992
(Continued)

OTHER PUBLICATIONS

Alversrand Uninett H, "Tags for the Identification of Languages: rfc 1766. txt," Ietf Standard, Internet Engineering Task Force, Ietf, Ch, Mar. 1995, pp. 1-31, XP015007553, Issn: 0000-0003.

(Continued)

*Primary Examiner* — John Chavis
(74) *Attorney, Agent, or Firm* — Turocy & Watson, LLP; Scott Speroff; John M. Miller (57) ABSTRACT

A software documentation system is provided. This includes a documentation object to store documentation data of an application. One or more custom language components are stored with the documentation objects to provide language display options for the application. The custom language components can be applied as a tag to indicate that tagged data items are to remain in a designated form such as a string name that is to remain in the designated language of the documentation designer. The custom language components can also be specified as differing forms of a similar language.

27 Claims, 10 Drawing Sheets

U.S. PATENT DOCUMENTS

| | | |
|---|---|---|
| 5,870,309 A | 2/1999 | Lawman |
| 5,901,323 A | 5/1999 | Milliken et al. |
| 5,943,675 A | 8/1999 | Keith et al. |
| 5,950,006 A | 9/1999 | Crater et al. |
| 5,987,239 A | 11/1999 | Kirsch |
| 5,991,793 A | 11/1999 | Mukaida et al. |
| 6,092,036 A | 7/2000 | Hamann |
| 6,110,214 A | 8/2000 | Klimasauskas |
| 6,139,201 A | 10/2000 | Carbonell et al. |
| 6,198,480 B1 | 3/2001 | Cotugno et al. |
| 6,204,782 B1 | 3/2001 | Gonzalez et al. |
| 6,219,649 B1 | 4/2001 | Jameson |
| 6,233,623 B1 | 5/2001 | Jeffords et al. |
| 6,252,589 B1 | 6/2001 | Rettig et al. |
| 6,263,487 B1 | 7/2001 | Stripf et al. |
| 6,298,393 B1 | 10/2001 | Hopsecger |
| 6,298,454 B1 | 10/2001 | Schleiss et al. |
| 6,385,496 B1 | 5/2002 | Irwin et al. |
| 6,411,987 B1 | 6/2002 | Steger et al. |
| 6,505,247 B1 | 1/2003 | Steger et al. |
| 6,536,029 B1 | 3/2003 | Boggs et al. |
| 6,539,271 B2 | 3/2003 | Lech et al. |
| 6,559,861 B1 | 5/2003 | Kennelly et al. |
| 6,574,639 B2 | 6/2003 | Carey et al. |
| 6,584,488 B1 | 6/2003 | Brenner et al. |
| 6,618,856 B2 | 9/2003 | Coburn et al. |
| 6,633,782 B1 | 10/2003 | Schleiss et al. |
| 6,701,324 B1 | 3/2004 | Cochran et al. |
| 6,754,668 B2 | 6/2004 | Noble et al. |
| 6,754,885 B1 | 6/2004 | Dardinski et al. |
| 6,766,214 B1 | 7/2004 | Wang et al. |
| 6,795,798 B2 | 9/2004 | Eryurek et al. |
| 6,799,148 B2 | 9/2004 | Ling et al. |
| 6,847,850 B2 | 1/2005 | Grumelart |
| 6,847,854 B2 | 1/2005 | Discenzo |
| 6,865,644 B2 | 3/2005 | Husted et al. |
| 6,952,727 B1 | 10/2005 | Lindner et al. |
| 6,975,913 B2 | 12/2005 | Kreidler et al. |
| 6,976,247 B1 | 12/2005 | Altfeld |
| 7,043,311 B2 | 5/2006 | Nixon et al. |
| 7,050,873 B1 | 5/2006 | Discenzo |
| 7,069,201 B1 | 6/2006 | Lindner et al. |
| 7,152,222 B2 | 12/2006 | Kumhyr et al. |
| 7,181,370 B2 | 2/2007 | Furem et al. |
| 7,206,646 B2 | 4/2007 | Nixon et al. |
| 7,206,965 B2 | 4/2007 | Roddy et al. |
| 7,218,974 B2 | 5/2007 | Rumi et al. |
| 7,228,310 B2 | 6/2007 | O'Brien |
| 7,249,356 B1 | 7/2007 | Wilson et al. |
| 7,272,665 B2 | 9/2007 | Yamada et al. |
| 7,275,062 B2 | 9/2007 | Deitz et al. |
| 7,286,888 B2 | 10/2007 | Monette et al. |
| 7,299,367 B2 | 11/2007 | Hamm et al. |
| 7,328,078 B2 | 2/2008 | Sanford et al. |
| 7,359,930 B2 | 4/2008 | Jackson et al. |
| 7,406,453 B2 | 7/2008 | Mundie et al. |
| 7,546,577 B2 * | 6/2009 | Do et al. ............... 717/108 |
| 7,568,184 B1 * | 7/2009 | Roth ............... 717/123 |
| 7,574,417 B1 | 8/2009 | McGreevy et al. |
| 7,584,216 B2 | 9/2009 | Travieso et al. |
| 7,616,095 B2 | 11/2009 | Jones et al. |
| 7,620,885 B2 * | 11/2009 | Moulckers et al. ............. 715/201 |
| 7,627,385 B2 | 12/2009 | McGreevy et al. |
| 7,672,740 B1 | 3/2010 | Baier et al. |
| 7,684,876 B2 | 3/2010 | Grgic |
| 7,693,585 B2 | 4/2010 | Kalan et al. |
| 7,742,833 B1 | 6/2010 | Herbst et al. |
| 7,853,555 B2 * | 12/2010 | Peoples et al. ............... 707/602 |
| 2002/0019839 A1 | 2/2002 | Shiu |
| 2002/0026317 A1 | 2/2002 | Labrique et al. |
| 2002/0054055 A1 | 5/2002 | Sone |
| 2002/0069235 A1 | 6/2002 | Chen |
| 2002/0120744 A1 | 8/2002 | Chellis et al. |
| 2002/0133523 A1 | 9/2002 | Ambler et al. |
| 2002/0169907 A1 | 11/2002 | Candea et al. |
| 2002/0174263 A1 | 11/2002 | Codd et al. |
| 2002/0184601 A1 | 12/2002 | Fitzhenry et al. |
| 2002/0184610 A1 | 12/2002 | Chong et al. |
| 2003/0014130 A1 | 1/2003 | Grumelart |
| 2003/0041135 A1 | 2/2003 | Keyes et al. |
| 2003/0100958 A1 | 5/2003 | Cachat et al. |
| 2003/0101208 A1 | 5/2003 | Chauvel et al. |
| 2003/0130899 A1 | 7/2003 | Ferguson et al. |
| 2003/0172107 A1 | 9/2003 | Leyfer et al. |
| 2003/0182303 A1 | 9/2003 | Gibson |
| 2004/0153437 A1 | 8/2004 | Buchan |
| 2004/0181294 A1 | 9/2004 | Deitz et al. |
| 2004/0225649 A1 | 11/2004 | Yeo et al. |
| 2005/0071755 A1 | 3/2005 | Harrington et al. |
| 2005/0085928 A1 | 4/2005 | Shani |
| 2005/0198034 A1 | 9/2005 | Boyer |
| 2005/0198406 A1 | 9/2005 | Sichner |
| 2005/0203648 A1 | 9/2005 | Martin |
| 2005/0210337 A1 | 9/2005 | Chester et al. |
| 2006/0004827 A1 | 1/2006 | Stuart |
| 2006/0020928 A1 | 1/2006 | Holloway et al. |
| 2006/0026559 A1 | 2/2006 | Gunturi et al. |
| 2006/0067334 A1 | 3/2006 | Ougarov et al. |
| 2006/0161268 A1 | 7/2006 | Frensch et al. |
| 2006/0218102 A1 | 9/2006 | Gibson et al. |
| 2006/0259160 A1 | 11/2006 | Hood et al. |
| 2006/0259499 A1 * | 11/2006 | Moulckers et al. ............. 707/100 |
| 2006/0291283 A1 | 12/2006 | Jin et al. |
| 2006/0294502 A1 | 12/2006 | Das et al. |
| 2007/0006039 A1 | 1/2007 | Fichter et al. |
| 2007/0027913 A1 | 2/2007 | Jensen et al. |
| 2007/0028070 A1 | 2/2007 | Avergun et al. |
| 2007/0038610 A1 | 2/2007 | Omoigui |
| 2007/0050348 A1 | 3/2007 | Aharoni et al. |
| 2007/0073744 A1 | 3/2007 | McVeigh et al. |
| 2007/0112447 A1 | 5/2007 | McGreevy et al. |
| 2007/0112801 A1 | 5/2007 | McGreevy et al. |
| 2007/0136533 A1 | 6/2007 | Church et al. |
| 2007/0142941 A1 | 6/2007 | McGreevy et al. |
| 2007/0156770 A1 | 7/2007 | Espelien |
| 2007/0244964 A1 | 10/2007 | Challenger et al. |
| 2007/0245339 A1 * | 10/2007 | Bauman et al. ............... 717/174 |
| 2007/0282577 A1 | 12/2007 | Lind |
| 2007/0288795 A1 | 12/2007 | Leung et al. |
| 2007/0294078 A1 | 12/2007 | Kim et al. |
| 2008/0027678 A1 | 1/2008 | Miller |
| 2008/0082577 A1 | 4/2008 | Hood et al. |
| 2008/0098356 A1 * | 4/2008 | Ericsson et al. ............... 717/123 |
| 2008/0126408 A1 | 5/2008 | Middleton |
| 2008/0127091 A1 * | 5/2008 | Ericsson et al. ............... 717/123 |
| 2008/0263518 A1 * | 10/2008 | Bank et al. ............... 717/120 |
| 2008/0313228 A1 | 12/2008 | Clark et al. |
| 2010/0146491 A1 * | 6/2010 | Hirano et al. ............... 717/137 |

FOREIGN PATENT DOCUMENTS

| | | |
|---|---|---|
| EP | 1109107 | 6/2001 |
| EP | 1307823 | 5/2003 |
| GB | 2347234 | 8/2000 |
| GB | 2353616 A1 | 2/2001 |
| WO | 2004027531 A1 | 4/2004 |
| WO | 2005006130 A2 | 1/2005 |
| WO | 2005006130 A3 | 1/2005 |

OTHER PUBLICATIONS

European Search Report for European Patent Application No. EP07117622 dated Feb. 5, 2007, 2 pgs.

Notice of Allowance mailed Dec. 13, 2010 for U.S. Appl. No. 11/862,180, 74 pages.

OA dated Nov. 19, 2010 for U.S. Appl. No. 12/783,229, 41 pages.

European Search Report dated Oct. 22, 2010 for European Patent Application No. EP 08 16 5010, 10 pages.

OA dated Jan. 4, 2011 for U.S. Appl. No. 11/536,550, 44 pages.

Notice of Allowance mailed Nov. 9, 2010 for U.S. Appl. No. 11/537,110, 38 pages.

OA dated Aug. 23, 2010 for U.S. Appl. No. 11/558,705, 44 pages.

OA dated Sep. 17, 2010 for U.S. Appl. No. 11/864,634, 43 pages.

OA dated Oct. 14, 2010 for U.S. Appl. No. 11/862,861, 43 pages.

OA dated Sep. 3, 2010 for U.S. Appl. No. 11/750,193, 68 pages.

"Major Canadian Natural Gas Producer Buys AnyWhere/AnyTime Services from Industrial Evolution" Mar. 12, 2001, Industrial Evolution pp. 1.

Real Time Intelligence at the Source-Deploying and EMbedded Historian. Users Conference 2005, pp. 1.
Miller, et al. "Extending the Reach of Enterprise Data Management in a World of M2M." ISA EXPO. Oct. 2005, pp. 1-7.
"Proficy Historian"; Dec. 16, 2004, GE FANUC, pp. 1-8.
European Search Report dated Feb. 22, 2008 for European Patent Application Serial No. EP 07 11 7388, 1 Page.
European Search Report dated Jan. 20, 2009 for European Patent Application No. EP08156281, 6 Pages.
EP Office Action for Application No. 08165215.8-1243 dated Mar. 3, 20009, 2 pages.
European Search Report and Written Opinion for European Application No. EP 08 16 5215, dated Dec. 8, 2008, 6 pages.
Sakharov. Macro-Processing in High-Level Languages. ACM SIGPLAN Notices, vol. 27, No. 11, Nov. 1, 1992, pp. 59-66, XP000328425, ISSN: 0362-1340. Last accessed Jan. 20, 2009, 18 pages.
Cardoso, et al. Macro-Based Hardware Compilation of Java (TM) Bytecodes Into a Dynamic Reconfigurable Computing System, Apr. 21, 1999. In IEEE Seventh Symposium on Field Programmable Custom Computing Machines, (FCCM'99). Napa Valley, California, Apr. 21-23, 1999. http://citeseerx.ist.psu.edu/viewdoc/summary?doi=10.1.1.41.8292. Last accessed Jan. 21, 2008, 10 pages.
European Search Report dated Dec. 18, 2007 for European Patent Application Serial No. 07117364.5-2221, 2 Pages.
European Search Report for European Patent Application No. EP07117614 dated Feb. 5, 2008, 8 pgs.
Wonderware Plant Intelligence Solution Helps Arla Foods Deliver Fresh Milk Products to the Tables of Europe. Last accessed Dec. 3, 2008, 4 pages.
Power RICH System, Enterprise Edition, Historian (PRS EE Historian) Version 1.5, last accessed Dec. 3, 2008, 16 pages.
OA dated Jul. 23, 2008 for U.S. Appl. No. 11/536,535, 31 pages.
OA dated Dec. 3, 2007 for U.S. Appl. No. 11/536,566, 35 pages.
OA dated Dec. 18, 2008 for U.S. Appl. No. 11/536,522, 15 pages.
OA dated Apr. 3, 2009 for U.S. Appl. No. 11/536,522, 20 pages.
OA dated Jul. 21, 2008 for U.S. Appl. No. 11/536,522, 21 pages.
OA dated Oct. 13, 2009 for U.S. Appl. No. 11/536,522, 22 pages.
OA dated Sep. 16, 2009 for U.S. Appl. No. 11/558,705, 23 pages.
OA dated Apr. 22, 2009 for U.S. Appl. No. 11/558,705, 23 pages.
OA dated Jul. 29, 2009 for U.S. Appl. No. 11/558,710, 18 pages.
OA dated Nov. 14, 2008 for U.S. Appl. No. 11/558,710, 18 pages.
OA dated Jul. 28, 2008 for U.S. Appl. No. 11/536,545, 26 pages.
OA dated Dec. 12, 2008 for U.S. Appl. No. 11/536,545, 18 pages.
OA dated Jul. 10, 2009 for U.S. Appl. No. 11/536,545, 30 pages.
OA dated Jul. 26, 2009 for U.S. Appl. No. 11/536,535, 40 pages.
OA dated Jan. 4, 2010 for U.S. Appl. No. 11/558,710, 37 pages.
CNOA Due Dec. 29, 2008 for Chinese Patent Application No. 200710162327.9, 6 pages.
OA dated Mar. 30, 2010 for U.S. Appl. No. 11/558,705, 44 pages.
European Search Report dated Mar. 25, 2010 for European Patent Application No. EP 07 12 0362, 6 pages.
"High Level Triggers, Data Acquisition and Controls." ATLAS Technical Design Report, Jun. 30, 2003, pp. 1-370, XP002570453, Chapters 1-7, 9, 11, 13. http://cdsweb.cem.ch/record/616089/files/cer-002375189.pdf. Last accessed Apr. 1, 2010, 196 pages.
Vermeulen, et al. "ATLAS Dataflow: the Read-Out Subsystem, Results from Trigger and Data Acquisition System Testbed Studies and from Modeling." 14th IEEE—NPSS Real time Conference, Stockholm, Sweden, Jun. 4-10, 2005, pp. 270-274, XP010859081, ISBN: 978-0-7803-9183-3.
Gameiro, et al. "The ROD Crate DAQ of the ATLAS Data Acquisition System." 14th IEEE—NPSS Real time Conference, Stockholm, Sweden, Jun. 4-10, 2005, pp. 527-531, XP010859117, ISBN: 978-0-7803-9183-3.
European Search Report dated Mar. 25, 2010 for European Patent Application No. EP 07 12 0357, 5 pages.
OA dated Mar. 24, 2010 for U.S. Appl. No. 11/750,193, 36 pages.
European Search Report dated Mar. 10, 2010 for European Application Serial No. EP 08 16 4957, 7 pages.
Charbonnier, et al. "Trends Extraction and Analysis for Complex System Monitoring and Decision Support." Feb. 1, 2005, Engineering Applications of Artificial Intelligence, Pineridge Press, Swansea, GB, pp. 21-36, XP025299588, ISSN: 0952-1976.
Uraikul, et al. "Artificial Intelligence for Monitoring and Supervisory Control of Process Systems." Nov. 30, 2006, Engineering Applications of Artificial Intelligence, Pineridge Press, Swansea, GB, pp. 115-131, XP005786108, ISSN: 0957-1976.
OA dated Apr. 1, 2010 for U.S. Appl. No. 11/863,216, 28 pages.
OA dated Jun. 25, 2010 for U.S. Appl. No. 11/862,182, 41 pages.
OA dated May 27, 2010 for U.S. Appl. No. 11/537,110, 77 pages.
OA dated Jul. 22, 2010 for U.S. Appl. No. 11/862,183, 39 pages.
A new general purpose compression method for searching in large collection, Bhadade, U.S.; Sharma, V.K.; Trivedi, A. I.; TENCON 2007—2007 IEEE Region 10 Conference Digital Object Identifier: 10.11 09ITENCON.2007.4428935. Publication Year: 2007 , pp. 1-4.
Input Data Representation for Self-Organizing Map in Software Classification, Yuqing Lin; Huilin Ye; Knowledge Acquisition and Modeling, 2009. KAM '09. Second International Symposium on vol. 2 Digital Object Identifier: 10. 11 09/KAM2009.151, Publication Year: 2009 , pp. 350-353.
Supervised and Traditional Term Weighting Methods for Automatic Text Categorization, Man Lan; Chew Lim Tan; Jian Su; Yue Lu; Pattern Analysis and Machine Intelligence, IEEE Transactions on vol. 31 , Issue: 4. Digital Object Identifier: 10.11 09/TPAMI2008.11 0 Publication Year: 2009 , pp. 721-735.
Selecting predicate logic for knowledge representation by comparative study of knowledge representation schemes, Ali, A.; Khan, M.A.; Emerging Technologies, 2009. ICET 2009. International Conference on Digital Object Identifier: 10.11 09/ICET2009.5353207 Publication Year: 2009 , pp. 23-28.
Notice of Allowance dated Jun. 13, 2010 for U.S. Appl. No. 11/862,891, 49 pages.
OA dated Jul. 8, 2010 for U.S. Appl. No. 11/558,710, 28 pages.
OA dated Jun. 11, 2010 for U.S. Appl. No. 11/862,180, 27 pages.
OA dated Jul. 23, 2010 for U.S. Appl. No. 11/536,550, 51 pages.
OA dated Mar. 22, 2011 for U.S. Appl. No. 12/783,229, 14 pages.
OA dated Mar. 21, 2011 for U.S. Appl. No. 12/691,302, 72 pages.
OA dated Mar. 3, 2011 for U.S. Appl. No. 11/864,634, 21 pages.
OA dated Oct. 19, 2011 for U.S. Appl. No. 12/783,229, 18 pages.
Notice of Allowance mailed Aug. 5, 2011 for U.S. Appl. No. 12/691,302, 78 pages.
OA dated Aug. 5, 2011 for U.S. Appl. No. 11/864,634, 20 pages.
OA dated Dec. 22, 2011 for U.S. Appl. No. 13/089,152, 42 pages.
OA dated Jan. 4, 2012 for U.S. Appl. No. 11/864,634, 20 pages.

* cited by examiner

CUSTOM LANGUAGE SUPPORT FOR PROJECT DOCUMENTATION AND EDITING

TECHNICAL FIELD

The subject invention relates generally to software development systems and more particularly to custom languages that are created and provided as an alternative documentation form to supplement or enhance spoken language documentation.

BACKGROUND

Software Documentation or Source Code Documentation is written text that accompanies computer software and is often created in a computer development environment. Generally, such documentation explains how the underlying code operates and/or how to utilize the code. The term software documentation can have more than one context and thus exist in different forms. Some example types of documentation include architecture or design documentation for software. Another form includes technical documentation of code, algorithms, interfaces, and APIs. Still yet other forms of documentation include manuals for the end-user, system administrators, support staff along with marketing literature including product briefs and promotional information.

Design documents tend to take a broad view. Rather than describe how things are used, this type of documentation focuses more on the why. For example, in a design document, a programmer may explain the rationale behind organizing a data structure in a particular manner, or may list member functions of a particular object and how to add new objects to the code. This may include explaining the reasons why a given class is constructed in a particular manner, outlining patterns, discussing alternative designs, outlining ideas for improvement, or providing plans for how to improve designs later on such as with respect to future projects. This type of documentation is typically not considered appropriate for code or technical documentation however that is designed with other requirements in mind.

Regarding technical documentation, this is the type of information most programmers think of when using the term software documentation. When creating software, code alone is insufficient. There should be some text along with the code to describe various aspects of its intended operation. This documentation is usually embedded within the source code itself so it is readily accessible to anyone who may be traversing though it. In one instance, comments may be added to source code that can be highly technical and are mainly employed to define and explain APIs, data structures and algorithms. For example, one might use this documentation to explain that a variable refers to a particular location or machine in a factory. It is important for code documents to be thorough, but not so verbose that it becomes difficult to maintain. In addition to source code documentation, other technical documentation requirements may include descriptions on tasks, routines, controllers, modules, data types, tags, phases, add-on instructions, and so forth.

Often, tools such as Doxygen, javadoc, ROBODoc, POD or TwinText can be used to auto-generate code documents— that is, they extract comments from the source code and create reference manuals in such forms as text or HTML files. Code documents are often organized into a reference guide style, allowing programmers to quickly look up an arbitrary function or class. Many programmers are comfortable with the notion of auto-generating documentation for various reasons. For example, since it is extracted from the source code itself (for example, through comments), the programmer can write it while referring to their code, and can thus employ the same tools used to create the source code, to generate the documentation.

In addition to standard documentation tasks, systems are now developed for markets across the global economy. Thus, not only is documentation required in the native language employed for code or system development, there often is a requirement to have the documentation localized into one or more foreign languages in addition to the language the original code was developed in. As development of software projects continues to become more global, users have a need to deploy software or system designs across the world where the language of the consumers of the respective design may be different than the language of the creators of the design. Thus, different languages may be spoken by the development engineer, the maintenance engineer, and the operators that view the design which can create problems for those who may need to update, alter, and/or operate the given design.

Another problem with current documentation schemes is that it may not be possible to easily associate certain control system documentation with a specified "spoken language" for example machine names or numeric constants. Also, different types of documentation may be desired for different user-types of a given project. For instance, a designer may document their code with long and short forms of the project documentation in the same spoken language, a maintainer may desire to view a shortened-version of project documentation out on the plant floor, whereas a troubleshooter may desire to view a longer-form version of project documentation to help get to the root of potential issues.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

Custom language components and options are provided to facilitate electronic documentation such as can be provided in a software development environment. Custom languages allow designers to tailor documentation for various needs and according to particular nuances associated with language such as dialects or the type of documentation that is generated for an application. Thus, a plurality of differing language components can be generated as a set and then individually selected for the needs of the end user of such documentation. In general, custom languages can be applied to different application situations. In one case, a language component may be tagged to indicate that no foreign language translation is to be applied to the documentation so tagged or marked. For example, for strings that are not translated or are not easily tied to a spoken-language, the user is able to specify a custom language in which to store/display those tagged components of project documentation. A specific example is a user who creates a custom language for "System Constants", without having to place this documentation in English (United States) or any other specified language. Thus, one language may be employed as the custom language that remains applied to the component regardless of underlying language translations that may have been developed for the overall documentation of a project or application.

Another example application relates to a type of user who creates a custom language for "Extended Documentation"

and associates it with a given language such as English, for example. The project may have "English (United States)" and "English (Extended Documentation)," where extended documentation may include a feature such as being more verbose (or some other language nuance) than standard English forms. As can be appreciated, custom languages can be developed for any language. This allows for multiple versions of documentation in the same (or similar) language targeting specific users of a system. When there are varying users with differing documentation needs, custom languages may save computer memory or interface screen real estate by targeting for someone monitoring a process, yet still provide enough information for a troubleshooter of a system, for example. Thus, end users can select the custom language features they need from one or more custom language components stored for a given documentation set.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Systems and methods are provided to facilitate software documentation. In one aspect, a software documentation system is provided. This includes a documentation object to store documentation data of an application. One or more custom language components are stored with the documentation objects to provide language display options for the application. The custom language components can be applied as a tag to indicate that tagged data items are to remain in a designated form such as a machine name that is to remain in the designated language of the documentation designer. The custom language components can also be specified as differing forms of a similar language. This includes storing differing versions of similar documentation where the forms are tailored to a given subset of users having differing contexts for the respective users.

It is noted that as used in this application, terms such as "component," "object," "interface," and the like are intended to refer to a computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process and/or thread of execution and a component may be localized on one computer and/or distributed between two or more computers, industrial controllers, and/or modules communicating therewith. Furthermore, it is noted that the term translated language and localized language can have similar meanings. Thus, documentation that has been translated from one language to another can be referred to as having been localized.

Figure 1:
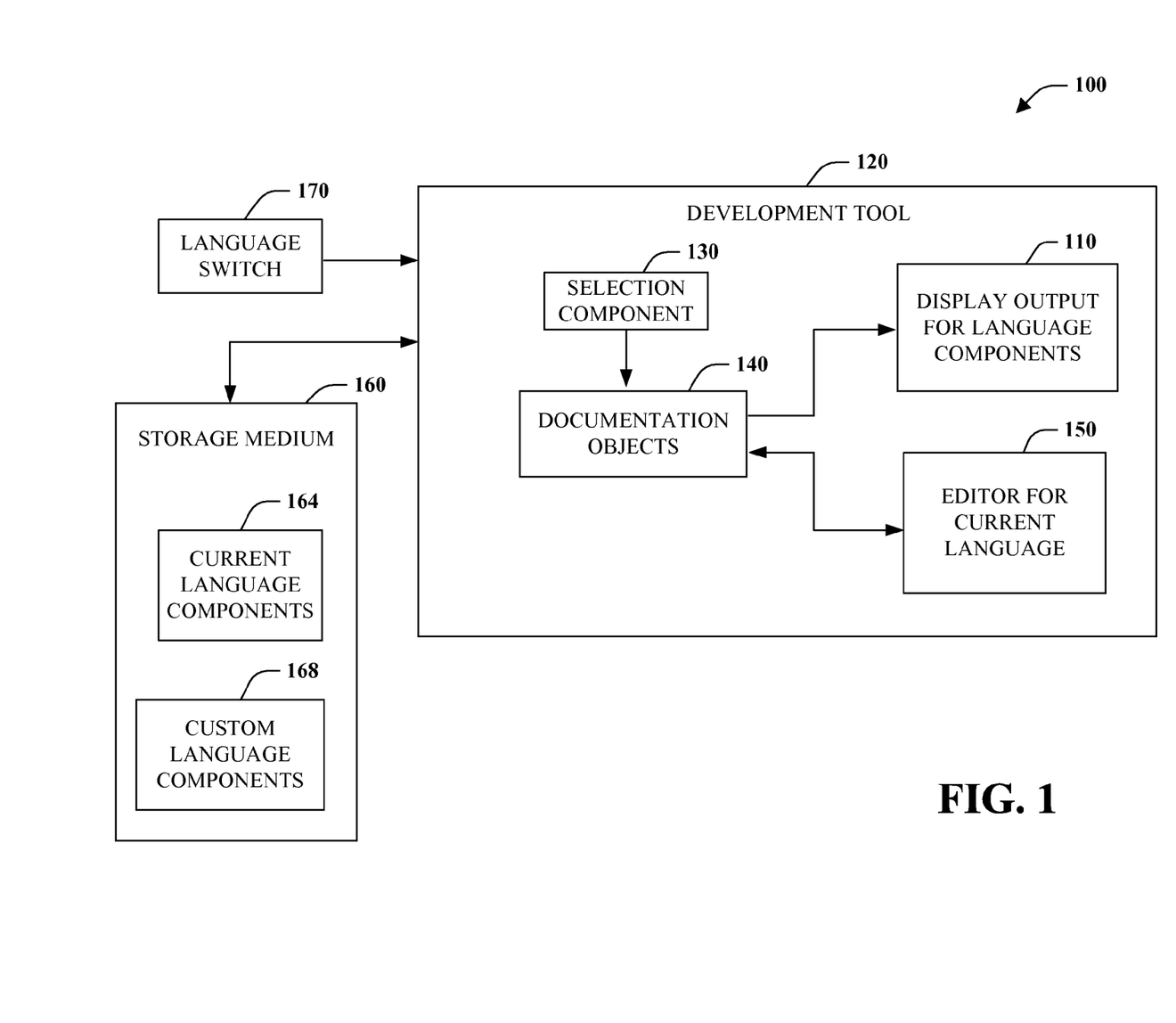
FIG. 1 is a schematic block diagram illustrating a software development system having custom language support.

Referring initially to FIG. 1, a software development or documentation system 100 provides a platform and display output 110 for software documentation, viewing, and editing. The display output 110 is associated with a development tool 120 that can provide for substantially any type of software, system, or component development. For example, the development tool 120 can be employed for general computer software development or for applications such as programmable logic controller software as will be described in more detail below. The development tool 120 can also be associated with textual language tools such as a computer or editors to document a given set or subset of components. A selection component 130 such as a cursor or vision sensor identifies one or more documentation objects 140 that can be edited via an editor 150.

As shown, the editor 150 is associated with a current language selected for the development tool 120, whereas the display component 110 provides a display of alternative languages that may be available for one or more of the documentation objects 140. Such objects 140 can include substantially any type of component that can have documentation such as comments associated therewith. These objects 140 include program objects, program instructions, specifications, design guidelines, algorithms, visual objects, sound objects, ladder logic elements, Sequential Function Chart elements, Function Block Diagrams, or higher level language objects such as associated with C++, Basic, Java, and so forth.

Generally, documentation associated with the documentation objects 140 can be stored in a storage medium 160 (e.g., database, data file), where current language documentation components 164 and custom language documentation components 168 can be imported and exported to/from the development tool 120. The documentation components 164 and 168 can be in substantially any language (e.g., English, German, French, Russian, and so forth). A language switch 170 can be associated with the development tool 120 to allow switching between a current language documentation context employed by the display component 110 and the editor 150 where the current documentation language component 164 are switched, to one or more alternative documentation forms supported by the custom language documentation components 168.

It is noted that there are several methods for generating the custom language components 168. One method is to send the current language components 164 out to a company and have one or more language forms generated from the current language components. For example, verbose comments could be sent out where a terse or reduced set of comments were provided as custom languages to the verbose set. In another example, a given language could have several dialects created as custom languages 168 for the respective language. Another method would allow developers to edit a comment at 150, save the edit, employ the language switch 170 to switch to an alternative language context, enter the comment in the alternative language and again save the comment according to the alternative language context thus building up the database with a set of custom language components 168. As can be appreciated, custom languages components 168 can be created in parallel at the editor 150 along with current language documentation components 164.

In general, the custom language components 168 and the ability to select between language components via the language switch 170 facilitate various applications. In one case, certain translations for a control system's project documentation may not be easily tied to an existing spoken-language, for example. Thus, the custom language components 168 may be configured by a user to store translations not readily associated with a provided language. For example, a user may desire to name/tag strings that are not translated into an alternative language as untranslatable strings.

Additionally, a user may desire to have a long-form piece of documentation for development and a more terse form of that documentation for maintenance. The custom language components 168 allow for "Language (long form)" and "Language (short form)" as another example, where Language specifies a given language such as French, English, German, Indian, and so forth. As will be described in more detail below, custom language components 168 can be developed for other applications such as languages that are tailored to a user's role. The user may configure the custom language components 168 to store translations of project documentation beyond those provided in a list of languages given for translations. During the configuration process, a custom language may be added to a project, where the user may then add translations to the custom language components 168.

Before proceeding, it is noted that the development system 100 can include means for displaying (display output 110) a documentation object 140 according to a current language context and means for storing custom language data (custom language objects 168) associated with the documentation object to generate at least one alternative form of project documentation. The system 100 can also include means for switching (language switch 170) between a current language context and an alternative language context.

Figure 2:
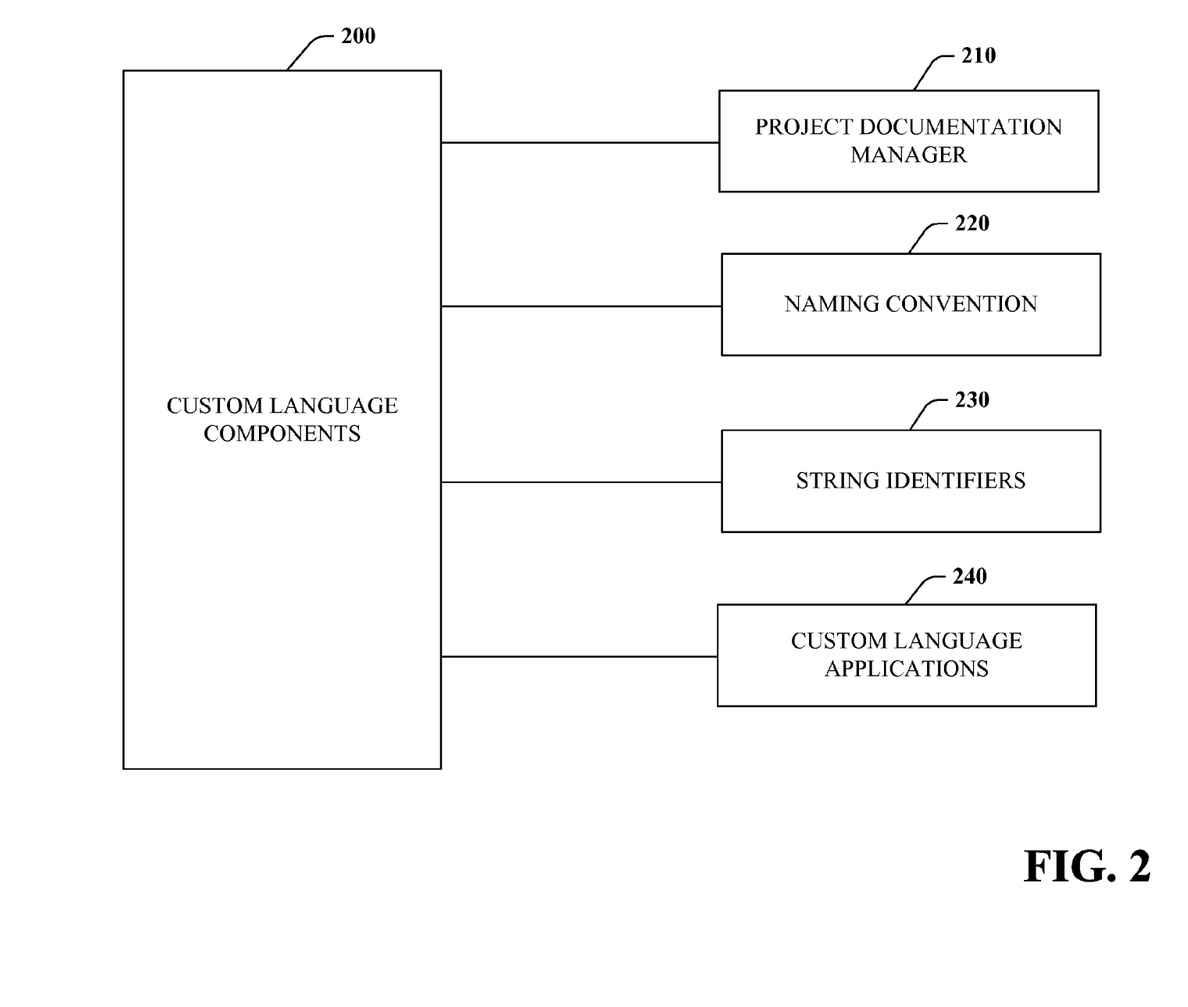
FIG. 2 is a diagram illustrating example custom language components for a documentation system.

Referring now to FIG. 2, example custom language components 200 are described in more detail for a documentation system. In general, the custom language components 200 provide an additional level of language customization in how these components provide and process project documentation beyond multiple foreign language support. For instance, consider a user that had an engineering staff developing a project and they included very verbose project documentation that not only documented what the code did, but why the developers decided to design in the manner they did. Similarly, when they provided documentation for production and their maintenance staff who worked in the same language, this class of users may have needed to know how the code operated, but didn't need the additional verboseness. Thus, the custom language components 200 allows users to have a nonstandard language designations which to add project documentation to. Using the above example, they could employ Developer (verbose version of documentation) and Maintenance (terse form of documentation) as custom languages in their project, in addition to any other standard languages.

Figure 3:
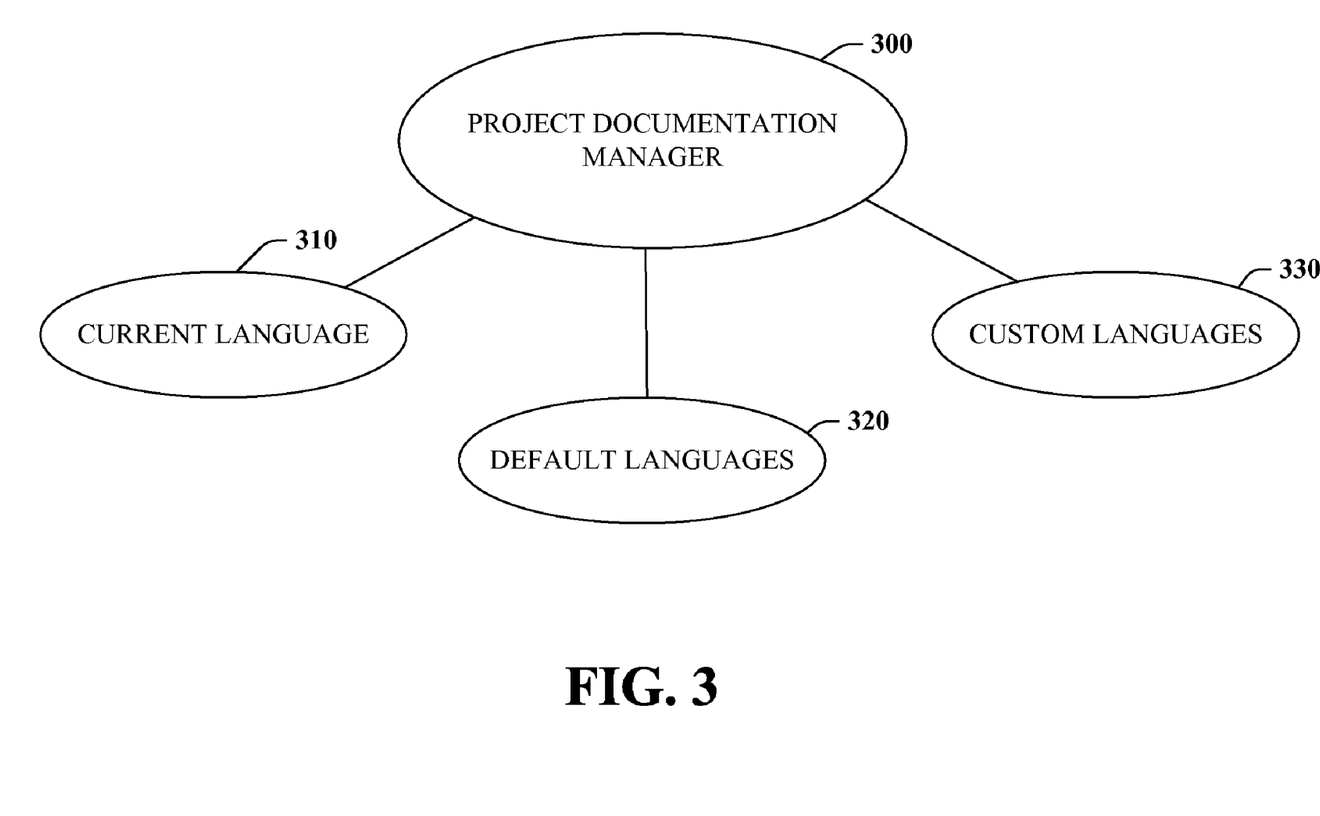
FIG. 3 is a diagram illustrating project documentation manager components for a development system.

A project documentation manager can be provided at 210 to support custom language components 210. The documentation manager 210 which will be described in more detail below with respect to FIG. 3, provides control over the various types of languages that may appear in a system and manages switching between the respective types. This includes providing support for current languages that are selected for a documentation system, default languages which may be alternative or foreign language components to the currently selected language, and the custom language components 200.

Proceeding to 220, custom language naming conventions are considered. In general, custom languages should not have names that collide with existing languages in the system. Custom language names can follow RFC 1766 naming convention and can be formatted internally in the system. This includes where the user can supply a custom name, and the system converts that name into a suitable naming convention in one example. Custom languages can optionally be based upon a base language or can be completely made up. Both the base language (or lack there of) and the provided custom name can factor into the RFC 1766 name that is generated by the system. For a custom language called "Midwestern" based upon English, the system can generate "en-Midwestern," for example.

At 230, string identifiers are considered for custom language support. In this case, portions of a language can be designated or tagged to indicate that no translation of the tagged component is to occur. Thus, another use of the custom language components 200 would be for a potential "un-translated strings" custom language that could be used as the default language for all documentation (or components thereof) that does not need to be translated. For instance, technical descriptions of parts and part numbers could be valid for all languages and could then exist in a custom language that would not be sent off for translation and would then be used as the default language for the components that have been identified as such.

At 240, custom language applications are considered. As noted above in one example, custom languages may be designated in the same language where one set of documentation or components is verbose for one set of users and another set of documentation is less verbose for a different type of users. Another type of application 240 includes defining more than one dialect for a given language as a custom language. In India and China for example, various dialects exist from known base languages and could be provided as custom language documentation alternatives for those regions employing such dialects. Other types of custom languages can be developed in view of security considerations. For instance, depending on the identity of a user logged into a system, different sets of documentation can be provided depending on that particular user's security clearance or security privileges.

In general, custom language components 200 can be generated to address substantially any type of nuance associated with a particular user. This can include role-based documentation sets where depending on the type of user identified (e.g., manager, engineer, maintenance, security), a differing set of custom language documentation components are provided in view of such identification. Still other types of documentation may be context based where automatic components detect a given context (or alerted to a context) (e.g., maintenance or troubleshooting context, operator context, design context, and so forth), and select relevant custom language documentation 200 to support the detected context.

Turning now to FIG. 3, a project documentation manager 300 is described in more detail. As noted above, the project documentation manager 300 provides control over the various types of languages that may appear in a system and manages switching between the respective types. This includes providing support for current languages at 310 that are selected for a documentation system, one or more default languages 320 which may be alternative or foreign language components to the currently selected language 310, and one or more custom language components 330. Generally, the project documentation manager 300 can be viewed as the control hub for managing various aspects of language switching. It provides a graphical user interface GUI client a single point of access by which to manage and direct different language switching components.

At 310, the project documentation manager 300 maintains the current language of the project. The current language specifies the language that the project documentation of the system is currently displayed in. For example, if an object in the system that had project documentation was queried for its project documentation, the requested project documentation returned would be in the current language. The documentation client is able to get and set the current language of the project. When the client sets the current language of the project, a Language Switch occurs.

At 320, the project documentation manager 300 maintains the default language of the project. The default language specifies the project documentation to display if the current language does not have an entry for the project documentation requested. The documentation client is able to get and set the default language of the project. When the client sets the default language of the project, a Language Switch occurs.

At 330, the project documentation manager 330 maintains the custom languages defined for a project or application. It tracks details of these languages so that they are recognized by the system as another permitted language. The information about these custom languages 330 is persisted in the database. Custom languages 330 are regenerated during an import process such that when an unknown language identifier is found during import, it can be assumed to be a custom language and is thus created.

Figure 4:
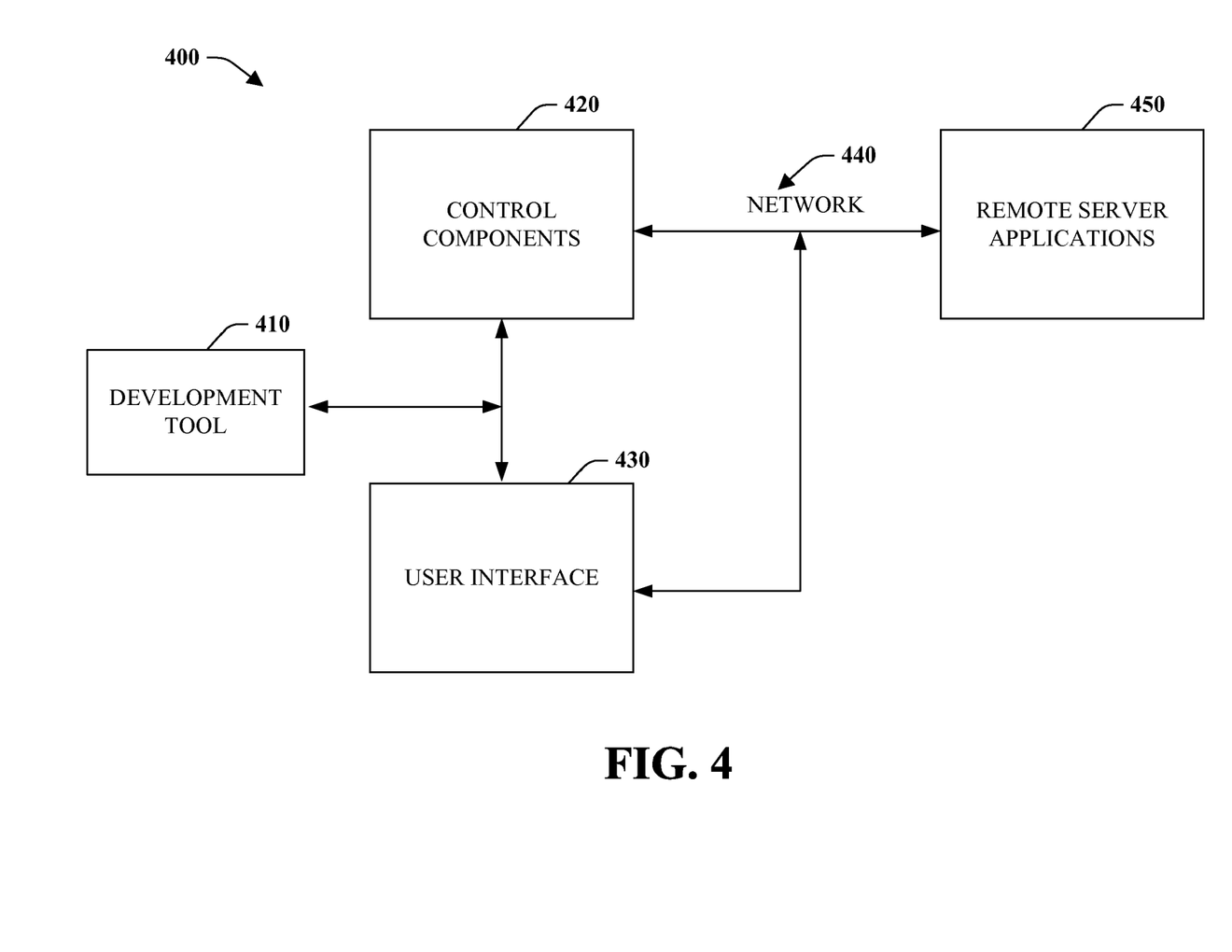
FIG. 4 is a diagram illustrating an example development or documentation system.

FIG. 4 illustrates an example system 400 that can be employed with the system 100 described above in FIG. 1. In this example, a development and documentation system 400 is shown that can be applied to an industrial control system for example. As shown, a development tool 410 can interact with one or more control components 420 and a user interface 430, where the interface can be employed to supply documentation in accordance with current or custom language contexts. The control components 420 and interface 430 can communicate across a network 440 with remote server applications.

The control components 420 can include various computer or network components such as servers, clients, programmable logic controllers (PLCs), communications modules, mobile computers, wireless components, control components and so forth which are capable of interacting across the network 440. Similarly, the term PLC as used herein can include functionality that can be shared across multiple components, systems, and/or networks 440. For example, one or more PLCs can communicate and cooperate with various network devices across the network 440. This can include substantially any type of control, communications module, computer, I/O device, sensor, Human Machine Interface (HMI)) such as the user interface 430 that communicate via the network 440 which includes control, automation, and/or public networks. The PLC can also communicate to and control various other devices such as Input/Output modules including Analog, Digital, Programmed/Intelligent I/O modules, other programmable controllers, communications modules, sensors, output devices, and the like, where the development tool 410 and user interface 430 can design/document various aspects for the control components 420.

The network 440 can include public networks such as the Internet, Intranets, and automation networks such as Control and Information Protocol (CIP) networks including DeviceNet and ControlNet. Other networks include Ethernet, DH/DH+, Remote I/O, Fieldbus, Modbus, Profibus, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Turning to FIGS. 4-7, various example interfaces are shown that illustrate various custom language concepts. It is to be appreciated however that the respective FIGS. 4-7 are exemplary in nature and can be provided in a plurality of various formats. This can include a Graphical User Interface (GUI) to interact with a development tool or documentation components such as any type of application that sends, retrieves, processes, and/or manipulates data, receives, displays, formats, and/or communicates data, and/or facilitates operation of the development system. For example, such interfaces can also be associated with an engine, server, client, editor tool or web browser although other type applications can be utilized.

The GUI can include a display having one or more display objects for editing or viewing documentation objects including such aspects as configurable icons, buttons, sliders, input boxes, selection options, menus, tabs and so forth having multiple configurable dimensions, shapes, colors, text, data and sounds to facilitate operations with the development tool. In addition, the GUI can also include a plurality of other inputs or controls for adjusting and configuring one or more aspects. This can include receiving user commands from a mouse, keyboard, speech input, web site, remote web service or other device such as a camera or video input to affect or modify operations of the GUI.

Figure 5:
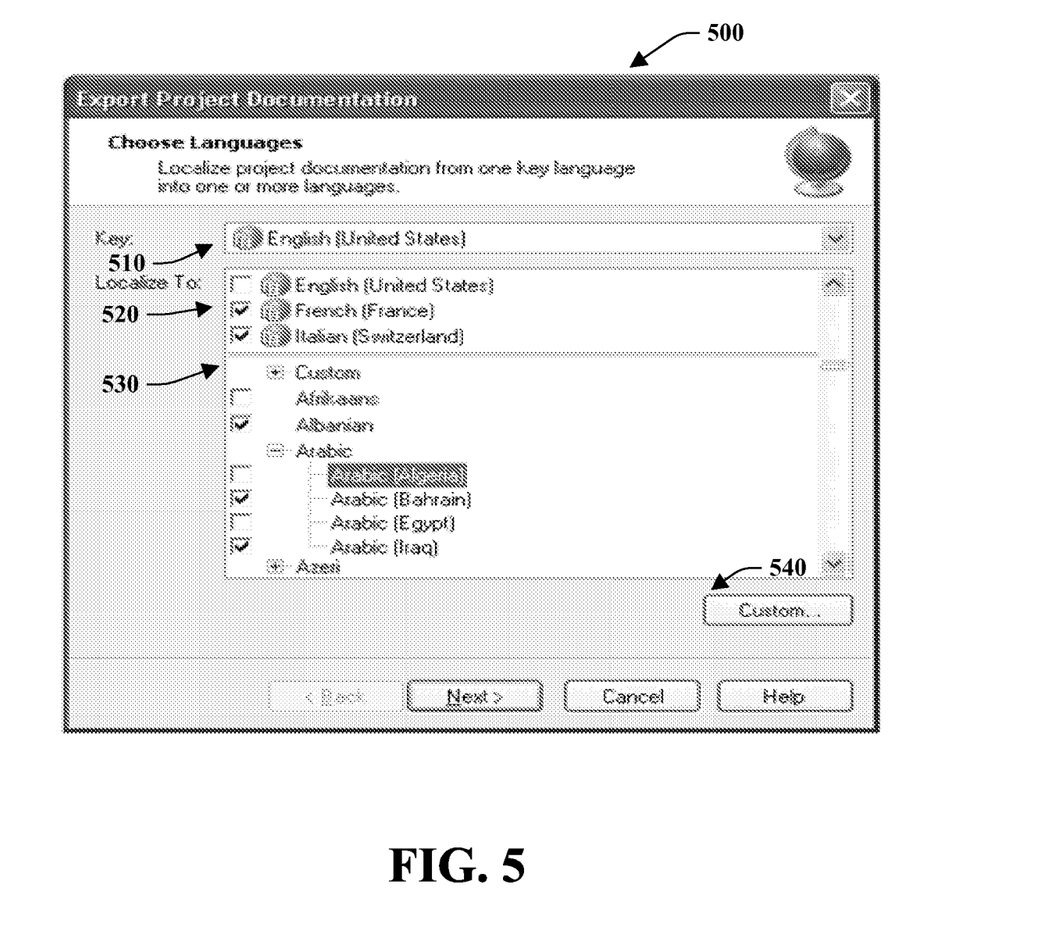
FIGS. 5-7 illustrate example custom language interfaces for development or documentation tools.

Referring now to FIG. 5, a configuration interface 500 is illustrated. At 510, a "Key" combo box is provided so that the user may specify a language to serve as a translation key for translations to be performed in a generated file from the configurations selected from the interface 500. The choices in the combo box 510 can be limited to the languages that have content in the current project. If no project documentation exists for a given language it should not be included in the "Key" set of choices at 510.

A "Localize To" list box 520 includes possible languages that are supported by the language switching components noted above. Languages that have content can be placed at the top of the list before a visual separator for easy selection. Any custom languages present in the project can be placed below the separator at 530. At 540, a "Custom . . . " button allows the user to manage their customized languages. A user can add a customized language to the list of languages that may be selected in the "Localize To" list box 520 or rename an already-created customized language.

Figure 6:
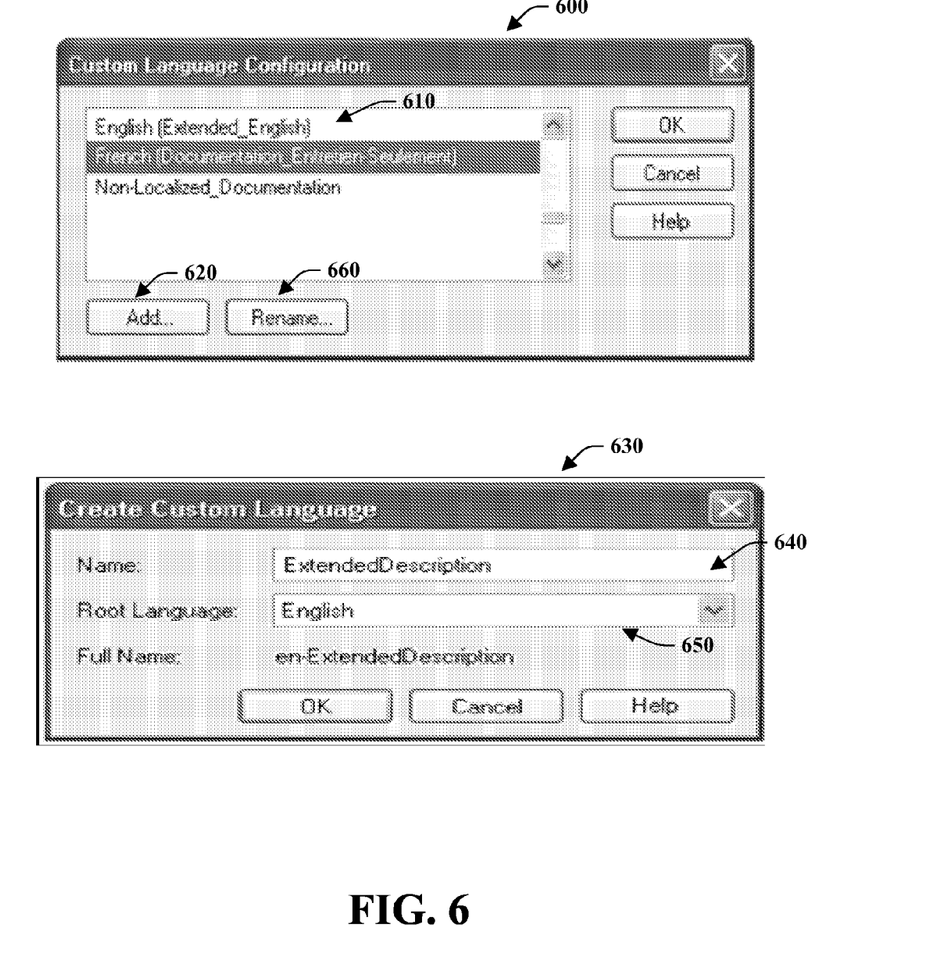
Figure 7:
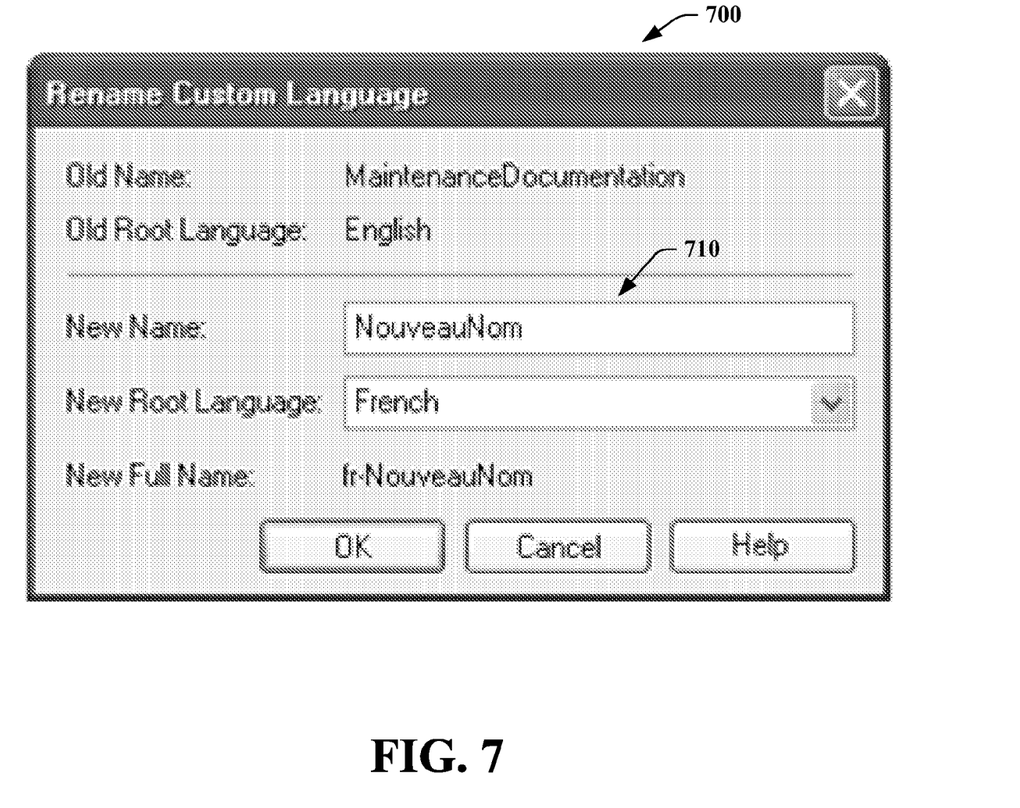

FIG. 6 shows an example interface that appears when the custom button 540 has been selected from FIG. 5. A custom language configuration dialog 600 includes a list box 610 of custom languages currently supported by the project. At 620, an Add . . . button is provided that, when pressed, brings up a dialog 630 where the user may specify the name of their custom language at 640. When accepted, the custom language name appears in the custom language list box 610. The name of the custom language should not collide with an existing language name in the system. They follow RFC 1766 naming conventions as noted above. A custom language may be associated with a Root language at 650. By default the Root Language can default to "<none>". If a root language is specified at 650, the custom language can appear in lists with the other languages from the root language. At 660, a rename button can be selected that brings up the interface 700 depicted in FIG. 7. Proceeding to FIG. 7, the button 660 from FIG. 6, when pressed brings up the dialog 700 where the user may rename an existing custom language at 710. The button 660 from FIG. 6 is enabled when a language is selected in the list box 610.

Figure 8:
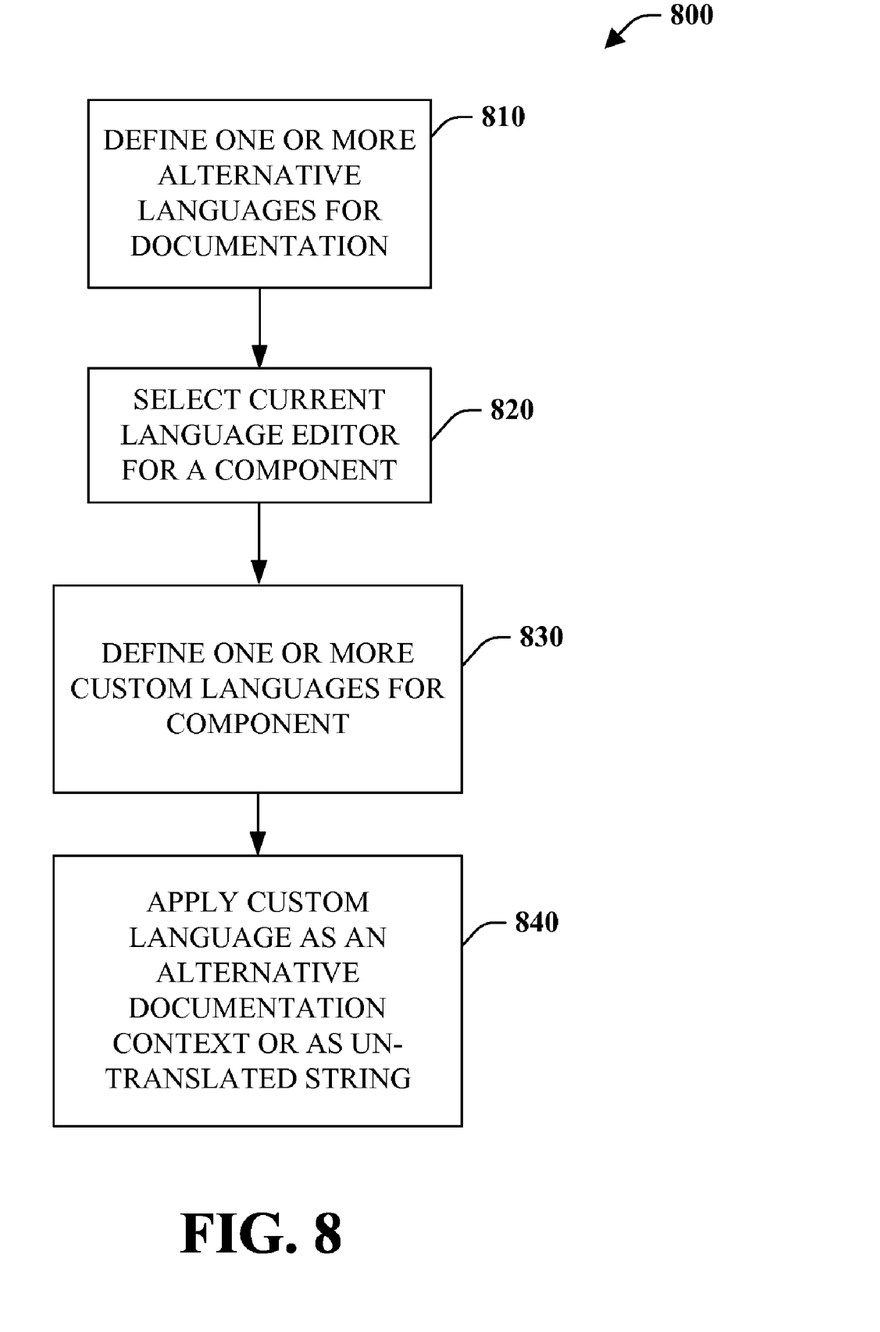
FIG. 8 is a flow diagram illustrating a documentation process.

FIG. 8 illustrates a software documentation process 800. While, for purposes of simplicity of explanation, the methodology is shown and described as a series of acts, it is to be understood and appreciated that the methodology is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology as described herein.

Proceeding to 810 of FIG. 8, one or more alternative languages are defined to document a given software object. This can include substantially any known language or codes that substitute for language. Comments in one language can be exported for example, and translated into comments for several other languages before being imported back into the system. Auto translation is also possible for alternative language components that are automatically generated form the selected current language. At 820, a current language editor is selected for a given documentation object including tags, programs, rungs, instructions, general documentation and so forth. In one example, English may be selected as the current language where future invocations of any editing function should employ English as the current language. In other development situations or environments, other languages may be selected as the current language editor.

At 830, after a language editor has been selected for a component at 820, one or more custom languages are defined for a selected documentation object. This can include using a base language such as English and defining nuanced or tailored versions off of the base language which act as the custom languages. At 840, custom languages are applied as alternative documentation contexts or as un-translated strings. For alternative contexts, custom languages may be defined based on dialects, verboseness, user's roles, security considerations and so forth. Based on a detected or stipulated context by the user, a custom language comment or documentation object can be viewed that is related to the determined or specified context.

In an un-translated strings context, custom languages may be applied to string names in a system where no language translation should be applied to the string. Thus, a machine name or constant in English for example that was tagged or identified as a custom language name, that name would not be translated into German when the current or default language was switched to German. In this manner, custom language tags allow components of documentation to remain in a desired form outside of a general base language description.

Figure 9:
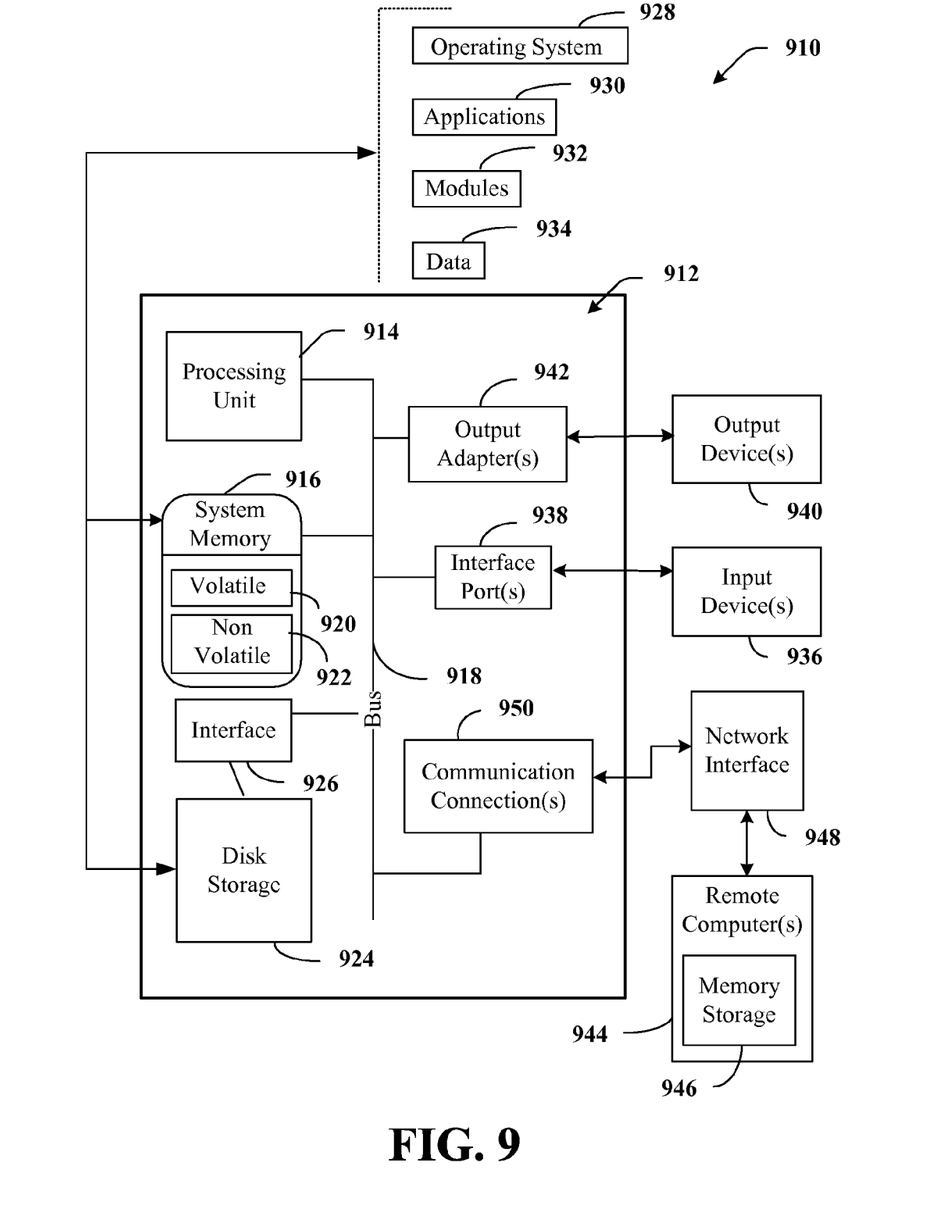
FIG. 9 illustrates an example development system computing environment.

With reference to FIG. 9, an exemplary environment 910 for implementing various aspects described herein includes a computer 912. The computer 912 includes a processing unit 914, a system memory 916, and a system bus 918. The system bus 918 couple system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates, for example a disk storage 924. Disk storage 924 includes, but is not limited to, devices like a magnetic disk drive, floppy disk drive, tape drive, Jaz drive, Zip drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that various components described herein can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912 and to output information from computer 912 to an output device 940. Output adapter 942 is provided to illustrate that there are some output devices 940 like monitors, speakers, and printers, among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

Figure 10:
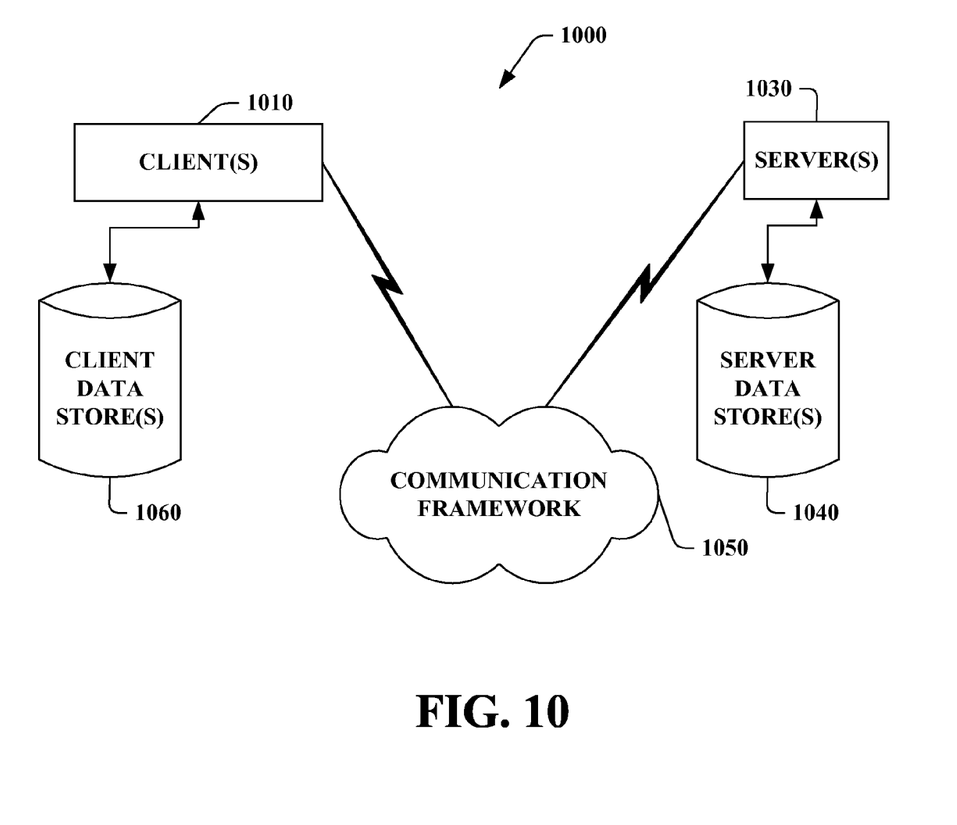
FIG. 10 illustrates an example client and server system for executing a editing and documentation process.

FIG. 10 is a schematic block diagram of a sample-computing environment 1000 that can be employed. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the components described herein, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operably connected to one or more client data store(s) 1060 that can be employed to store information local to the client(s) 1010. Similarly, the server(s) 1030 are operably connected to one or more server data store(s) 1040 that can be employed to store information local to the servers 1030.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A software documentation system, comprising:
    a memory communicatively coupled to a processor, the memory having stored therein computer-executable instructions configured to implement the documentation system, including:
        a documentation object configured to store documentation data of an application in multiple language formats; and
        one or more custom language components configured to facilitate selection of a current language, from the multiple language formats, in which to display the documentation data, wherein a custom language component of the one or more custom language components is configured to be applied as a tag to a selected data item of the documentation data to indicate that the selected data item is to remain in a designated language form regardless of the current language.

2. The system of claim 1, wherein the one or more custom language components are specified as differing forms of a similar language or specified as differing forms of a user-defined language.

3. The system of claim 1, wherein the one or more custom language components include at least a first custom language component associated with a verbose format of a given language and a second custom language component associated with a terse format of the given language, and wherein the first custom language component comprises fewer words than the second custom language component.

4. The system of claim 1, wherein at least one of the one or more the custom language components is associated with a language dialect.

5. The system of claim 1, wherein at least one of the one or more custom language components is associated with a role.

6. The system of claim 5, wherein the role is at least one of an operator role, a designer role, a maintenance role, a security role, or a managerial role.

7. The system of claim 1, wherein the a first custom language component of the one or more custom language components is associated with a security identifier that allows the first custom language component to be accessed during a log-in session associated with the security identifier.

8. The system of claim 1, further comprising a selection component configured to trigger activation of a programming language editor.

9. The system of claim 8, wherein the programming language editor is associated with at least one of ladder logic, a sequential function chart, a tag editor, a properties editor, a function block editor, or a structured text editor.

10. The system of claim 1, further comprising at least one configuration menu configured to provide configuration options for the one or more custom language components.

11. The system of claim 10, wherein the configuration menu is configured to provide an interface to allow the one or more custom language components to be selectively associated with a root language.

12. The system of claim 11, wherein association with the root language causes the one or more custom language components to appear in a selection list with other custom language components associated with the root language.

13. The system of claim 1, wherein the configuration menu includes a component to localize the one or more custom language components.

14. The system of claim 1, further comprising a project documentation manager configured to manage a current language in which the documentation data is to be displayed in response to a request for the documentation data, a default language in which the documentation data is to be displayed no current language being specified, and one or more custom languages defined for the documentation data.

15. The system of claim 1, further comprising a naming convention component configured to format names, designated for the one or more custom language components, to conform with at least one naming standard.

16. The system of claim 15, wherein the naming convention component is associated with a naming standard.

17. The system of claim 1, further comprising a language switch configured to alter a display of the documentation data between one or more of the multiple language formats.

18. A non-transitory computer-readable medium having a data structure stored thereon to facilitate documentation, comprising:
- a first data field to specify a current language in which to display stored documentation data;
- a second data field to specify one or more custom languages associated with the stored documentation data;
- a third data field to bind the one or more custom languages to the first data field to allow the current language to be switched to a selected one of the one or more custom languages; and
- a tag field to identify a portion of the stored documentation data that is to remain as non-localized text regardless of the current language of the selected one or more custom languages.

19. The computer-readable medium of claim 18, further comprising a role field to associate the one or more custom languages with respective roles.

20. The computer-readable medium of claim 19, wherein the role field is associated with at least one of a security role, a maintenance role, an operator role, a designer role, a managerial role, or a developer role.

21. The computer-readable medium of claim 18, further comprising a verbose field to specify which of a long form of the documentation data or a short form of the documentation data is to be displayed.

22. The computer-readable medium of claim 18, further comprising a switch field to indicate a change from the current language to at least one of the one or more custom languages.

23. The computer-readable medium of claim 18, further comprising at least one configuration field for the one or more custom languages.

24. A method for generating project documentation, comprising:
    employing a processor to facilitate executing computer-executable instructions stored on a non-transitory computer-readable medium to implement acts, including:
        defining one or more comments in a current language;
        defining one or more other comment forms for the current language;
        displaying the one or more comments in a selected one of the one or more other comment forms;
        tagging a first comment of the one or more comments as an un-localizable form; and
        maintaining, in response to the tagging, a same language form for the first comment across the one or more other comment forms.

25. The method of claim 24, further comprising automatically generating a name for at least one of the one or more custom language forms.

26. The method of claim 24, further comprising switching between the one or more custom language forms via a user interface.

27. A computer-readable medium having stored thereon computer-executable components that, in response to execution, cause a computing system to perform operations including:
    displaying a documentation object according to a current language context;
    storing custom language data, associated with the documentation object, representing at least one alternative form of the current language context;
    displaying the documentation object according to the at least one alternative form in response to a switching instruction;
    tagging a subset of the documentation object as a custom language name; and
    maintaining, in response to the tagging, a same language form for the subset of the documentation object for the current language context and the at least one alternative form.

* * * * *